(12) United States Patent
Wang et al.

(10) Patent No.: US 9,363,681 B2
(45) Date of Patent: Jun. 7, 2016

(54) METHOD AND APPARATUS FOR ESTABLISHING CELL RESELECTION LIST

(71) Applicant: HUAWEI TECHNOLOGIES CO., LTD., Shenzhen (CN)

(72) Inventors: Jiyong Wang, Shanghai (CN); Yongjun Yu, Shanghai (CN); Yang Zhao, Shanghai (CN); Ming Fang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/221,542

(22) Filed: Mar. 21, 2014

(65) Prior Publication Data

US 2014/0204907 A1    Jul. 24, 2014

Related U.S. Application Data

(63) Continuation of application No. 13/447,924, filed on Apr. 16, 2012, now Pat. No. 8,718,642, and a continuation of application No. PCT/CN2010/077761, filed on Oct. 15, 2010.

(30) Foreign Application Priority Data

Oct. 15, 2009   (CN) .......................... 2009 1 0110793

(51) Int. Cl.
*H04W 48/16*   (2009.01)
*H04W 16/16*   (2009.01)
(Continued)

(52) U.S. Cl.
CPC .......... *H04W 16/16* (2013.01); *H04W 36/0083* (2013.01); *H04W 48/14* (2013.01); *H04W 48/16* (2013.01); *H04W 36/00* (2013.01)

(58) Field of Classification Search
CPC ..... H04W 48/14; H04W 48/16; H04W 48/20; H04W 48/02; H04W 48/08; H04W 16/16; H04W 36/004; H04W 36/0083
USPC .............. 455/434, 509, 512, 435, 450, 452.1, 455/424; 370/328, 329, 331, 277
See application file for complete search history.

(56) References Cited

U.S. PATENT DOCUMENTS 6,765,891 B2 *   7/2004   Laitinen et al. ................ 370/331
7,639,641 B2 *   12/2009  Laitinen et al. ................ 370/328
(Continued)

FOREIGN PATENT DOCUMENTS

CN    1868220 A     11/2006
CN    101022583 A    8/2007
(Continued)

OTHER PUBLICATIONS

"$3^{rd}$ Generation Partnership Project; Technical Specification Group GSM/EDGE Radio Access Network; Mobile radio interface layer 3 specification; Radio Resource Control (RRC) protocol (Release 9)"; 3GPP TS 44.018 V9.0.0 (Feb. 2009); (421 pages).

(Continued)

*Primary Examiner* — Nizar Sivji
(74) *Attorney, Agent, or Firm* — Staas & Halsey LLP (57) ABSTRACT

The embodiments of the present invention disclose a method for establishing a cell reselection list is provided. A network and a terminal establish frequency indexes for the cell reselection list, so that when a network side delivers an RAT and frequency priority information, the priority information may be delivered according to frequency indexes in a frequency list, thus implementing cell reselection that is based on the priority for the terminal.

17 Claims, 3 Drawing Sheets obtaining a system message, where the system message includes frequency information used in a 3G neighbour cell list, and optionally includes frequency information that is used in a cell reselection list but not used in the 3G neighbour cell list

↓

Constructing a cell reselection list and/or a frequency list according to the system message; creating indexes in ascending order in the cell reselection list and/or the frequency list according to an appearance order from first to last of the frequency information used in the 3G neighbour cell list in the system message; and when the system message includes the frequency information used in the cell reselection list but not used in the 3G neighbour cell list, creating indexes at the bottom of the cell reselection list and/or the frequency list according to an appearance order from first to last of the frequency information used in the cell reselection list but not used in the 3G neighbour cell list (51) Int. Cl.
*H04W 36/00* (2009.01)
*H04W 48/14* (2009.01)

(56) References Cited

U.S. PATENT DOCUMENTS

| | | | |
|---|---|---|---|
| 8,180,344 B2 | 5/2012 | Johansson et al. | |
| 8,718,642 B2 | 5/2014 | Wang et al. | |
| 2003/0189912 A1* | 10/2003 | Laitinen et al. | 370/338 |
| 2005/0020240 A1 | 1/2005 | Minter | |
| 2005/0085232 A1 | 4/2005 | Laitinen et al. | |
| 2006/0183482 A1* | 8/2006 | Ueda | 455/439 |
| 2006/0194582 A1* | 8/2006 | Cooper | 455/436 |
| 2008/0188215 A1 | 8/2008 | Bergstroem et al. | |
| 2008/0189360 A1 | 8/2008 | Kiley et al. | |
| 2008/0192697 A1* | 8/2008 | Shaheen | 370/331 |
| 2008/0225797 A1* | 9/2008 | Kim | 370/331 |
| 2009/0047658 A1* | 2/2009 | Mulvey et al. | 435/5 |
| 2009/0047961 A1* | 2/2009 | Kim | 455/436 |
| 2010/0029277 A1* | 2/2010 | Ekstrom et al. | 455/436 |
| 2010/0046470 A1* | 2/2010 | Sekiya | 370/331 |
| 2010/0061331 A1 | 3/2010 | Guo et al. | |
| 2010/0105392 A1 | 4/2010 | Cheng et al. | |
| 2011/0026493 A1 | 2/2011 | Gao et al. | |
| 2012/0046066 A1 | 2/2012 | Tamura et al. | |
| 2012/0202489 A1 | 8/2012 | Wang et al. | |
| 2012/0276945 A1 | 11/2012 | Chindapol et al. | |
| 2013/0005380 A1 | 1/2013 | Nobukiyo | |
| 2013/0114523 A1 | 5/2013 | Chatterjee et al. | |
| 2013/0237266 A1 | 9/2013 | Futaki | |
| 2013/0322308 A1 | 12/2013 | Yu et al. | |
| 2014/0204907 A1 | 7/2014 | Wang et al. | |

FOREIGN PATENT DOCUMENTS

| | | |
|---|---|---|
| CN | 101267660 | 9/2008 |
| CN | 101409920 A | 4/2009 |
| CN | 101426307 | 5/2009 |
| CN | 101500287 | 8/2009 |
| CN | 101536585 A | 9/2009 |
| CN | 101547484 A | 9/2009 |
| CN | 101547495 | 9/2009 |
| CN | 101686487 | 3/2010 |
| CN | 101742580 | 6/2010 |
| CN | 102045685 | 6/2012 |
| KR | 10-2008-0075292 | 8/2008 |
| WO | WO 2006/134027 A1 | 12/2006 |

OTHER PUBLICATIONS

International Search Report mailed Jan. 27, 2011 issued in corresponding International Patent Application No. PCT/CN2010/077761.

International Preliminary Report on Patentability mailed Jan. 27, 2011 issued in corresponding International Patent Application No. PCT/CN2010/077761.

3GPP TS 44.018 V7.18.0, "3$^{rd}$ Generation Partnership Project; Technical Specification Group GSM/EDGE Radio Access Network; Mobile radio interface layer 3 specification; Radio Resource Control (RRC) protocol" Release 7, Sep. 2009, pp. 1-401.

3GPP TS 44.060 V7.18.0, "3$^{rd}$ Partnership Project: Technical Specification Group GSM/EDGE Radio Access Network; General Packet Radio Services (GRPS); Mobile Station (MS)—Base Station System (BSS) interface; Radio Link Control/Medium Access Control (RLC/MAC) protocol" Release 7, Sep. 2009, pp. 1-565.

International Search Report for PCT/CN2010/077761 mailed Jan. 27, 2011.

Non-Final Office Action mailed Feb. 21, 2013 in parent U.S. Appl. No. 13/447,924 (37 pages).

Notice of Allowance mailed Dec. 23, 2013 in parent U.S. Appl. No. 13/447,924 (41 pages).

* cited by examiner obtaining a system message, where the system message includes frequency information used in a 3G neighbour cell list, and optionally includes frequency information that is used in a cell reselection list but not used in the 3G neighbour cell list

↓

Constructing a cell reselection list and/or a frequency list according to the system message; creating indexes in ascending order in the cell reselection list and/or the frequency list according to an appearance order from first to last of the frequency information used in the 3G neighbour cell list in the system message; and when the system message includes the frequency information used in the cell reselection list but not used in the 3G neighbour cell list, creating indexes at the bottom of the cell reselection list and/or the frequency list according to an appearance order from first to last of the frequency information used in the cell reselection list but not used in the 3G neighbour cell list

FIG. 1

S21: Create a 3G Neighbour Cell List according to a system message during obtaining the system message, where the system message optionally includes frequency information that is not included in the 3G Neighbour Cell List

↓

S22: A cell reselection list is created according to the 3G Neighbour Cell List when the system message does not include the frequency information that is not included in the 3G Neighbour Cell List; and the cell reselection list is created according to the 3G Neighbour Cell List and the system message when the system message includes the frequency information that is not included in the 3G Neighbour Cell List

↓

S23: Indexes are created for frequencies that are included in the 3G Neighbour Cell List, and when the system message includes the frequency information that is not included in the 3G neighbour cell list, indexes are created for frequencies that is not included in the 3G Neighbour Cell List but included in the system message

FIG. 2

S31: Obtain a cell modification message, modify a 3G Neighbour Cell List according to the cell modification message, and obtain a modified 3G Neighbour Cell List S32: Update a GPRS 3G Cell Reselection List according to the modified 3G Neighbour Cell List, where a modified GPRS 3G Cell Reselection List includes frequencies and/or cell information in the modified 3G Neighbour Cell List

METHOD AND APPARATUS FOR ESTABLISHING CELL RESELECTION LIST

CROSS-REFERENCE TO RELATED APPLICATIONS

This application is a continuation of U.S. patent application Ser. No. 13/447,924, filed on Apr. 16, 2012, which is a continuation of International Application No. PCT/CN2010/077761, filed on Oct. 15, 2010. The International Patent Application claims priority to Chinese Patent Application No. 200910110793.1, filed on Oct. 15, 2009, The afore-mentioned patent applications are hereby incorporated by reference in their entireties.

FIELD OF THE INVENTION

The present invention relates to the field of communications, and in particular, to a method and an apparatus for establishing a cell reselection list.

BACKGROUND OF THE INVENTION

In a GERAN network, a measurement function and a reselection function of a cell totally relate to the following lists.

1) Broadcast Control Channel Allocation List (Broadcast Control Channel Allocation List, BA List)

Generally, the BA list is merely used for functions of measuring a GERAN cell, reporting the measurement, and cell reselection, and the BA list includes a frequency and frequency index information of a GERAN neighbour cell. The BA list is constructed by an SI2/SI2bis/SI2ter message or an SI5/SI5bis/SI5ter message, or is constructed by PSI3 and PSI3bis when a packet broadcast control channel (Packet Broadcast Control Channel, PBCCH) exists.

2) GSM Neighbour Cell List (GSM Neighbour Cell List, GSM NCL)

Generally, The GSM NCL is also merely used for the functions of measuring a GERAN cell, reporting the measurement, and cell reselection. The GSM NCL includes a frequency of a GERAN neighbour cell, a base transceiver station identity code (Base transceiver station Identity Code, BSIC) of a GERAN neighbour cell, and cell index information of a GERAN neighbour cell. The GSM NCL is constructed by the BA list and SI2quater or by the BA list and a Measurement Information message, or is constructed by PSI3 and PSI3bis when the PBCCH exists, and at this time, the GSM NCL is the same as the BA list.

3) 3G Neighbour Cell List (3G Neighbour Cell List, 3G NCL)

Generally, the 3G NCL is used to measure a 3G neighbour cell and report the measurement, and the list includes a frequency of the 3G neighbour cell, scrambling of the 3G neighbour cell, a bandwidth of the 3G neighbour cell, and index information of a 3G cell. The 3G Neighbour Cell list is constructed by an SI2quater message when the PBCCH does not exist, or is constructed by a PI3quater message when the PBCCH exists. The 3G NCL may be modified by a packet measurement order (Packet Measurement Order, PMO) message or a packet cell change order (Packet Cell Change Order, PCCO) message.

4) 3G Cell Reselection List/GPRS 3G Cell Reselection List (3G Cell Reselection List/GPRS 3G Cell Reselection List)

The 3G Cell Reselection List/GPRS 3G Cell Reselection List is used for reselection of a 3G neighbour cell, and the list includes a frequency of a 3G cell, scrambling information of the 3G cell and bandwidth information of the 3G cell, or may further include only frequency information other than the foregoing specific cell information. Since in a 3G network, many different cells exist in the same frequency, and the different cells are distinguished according to parameters such as scrambling and a bandwidth, in the case that only the frequency information is given, when cell reselection is performed, any cell in the frequency may be selected. The 3G Cell Reselection list is constructed by the SI2quater message and the SI2ter message. The GPRS 3G Cell Reselection list is constructed by the SI2quater message and the SI2ter message when the PBCCH does not exist, or is constructed by the PSI3quater message when the PBCCH exists.

5) Neighbour Cell List (Neighbour Cell List, NCL)

The NCL is generally used in an enhancement-type measurement report, and is used to measure and report all neighbour cells (including the GERAN cell and the 3G cell), and the list includes a frequency and BSIC information of the GERAN cell, a frequency, scrambling and a bandwidth of the 3G cell, and index information of each cell. The NCL is generally formed through a series connection of the GSM NCL and the 3G NCL.

6) E-UTRAN Neighbour Cell List (E-UTRAN Neighbour Cell List, E-UTRAN NCL)

The E-UTRAN NCL is used for measurement, report and reselection of an E-UTRAN neighbour cell and the list includes a frequency of the E-UTRAN neighbour cell, information about an E-UTRAN neighbour cell that is not allowed to be assessed, and a frequency index of the E-UTRAN neighbour cell. The E-UTRAN NCL is constructed by the SI2quater message or the Measurement Information message or the PSI3quater message, and may be modified by the PMO message or the PCCO message.

In a current measurement report, for the GERAN cell, a frequency index of the BA list and a BSIC value are used to identify one GERAN cell; for a UTRAN cell, a cell index in the 3G NCL is used to identify one UTRAN cell; and for the E-UTRAN NCL cell, the frequency index in the E-UTRAN NCL and physical cell identification (Physical Cell Identification, PCI) are used to identify one cell.

In the prior art, cell information included in the 3G Cell Reselection list is jointly provided by the SI2quater message and the SI2ter message. In the case that the PBCCH does not exist, the GPRS 3G Cell Reselection list is equal to the 3G Cell Reselection list, and in the case that the PBCCH exists, the GPRS 3G Cell Reselection list is provided by the PSI3quater message. Since the 3G Cell Reselection list/ GPRS 3G Cell Reselection list is used only in autonomous cell reselection, and the GPRS 3G Cell Reselection list is merely used for a terminal to perform reselection in a network controlled cell reselection mode 0 (Network Controlled cell reselection Mode 0, NC0) and a network controlled cell reselection mode 1 (Network Controlled Mode 1, NC1), a frequency and a cell index are not defined during construction of the list, and during entering a connected mode, since no cell index exists in the GPRS 3G Cell Reselection list, a network side modifies only the 3G Neighbour list through the PMO message or the PCCO message, but does not modify the GPRS 3G Cell Reselection list.

A priority concept is brought into a current standard protocol, and the network side delivers priority information of each RAT in a manner of a 3G cell frequency index, that is, a priority of each frequency is delivered according to a frequency index of each frequency in the 3G. Since no frequency index is established in the 3G Cell Reselection list/GPRS 3G Cell Reselection list, priority information cannot be brought into the 3G Cell Reselection list/GPRS 3G Cell Reselection list. However, the 3G Cell Reselection list/GPRS 3G Cell Reselection list is a list used for cell reselection, and during the cell reselection, because no related priority information exists in the frequency included in the list, the terminal fails to perform the cell reselection that is based on the priority.

In another aspect, generally, the PMO or PCCO modifies only the 3G Neighbour Cell list, but does not modify the 3G Cell Reselection list/GPRS 3G Cell Reselection list. Since the 3G Neighbour Cell list is used for the measurement and report, and the 3G Cell Reselection list/GPRS 3G Cell Reselection list is used for the cell reselection, the network fails to change related information about the cell reselection of the terminal when a 3G frequency is added or deleted through the PMO or the PCCO.

SUMMARY OF THE INVENTION

In order to solve a technical problem, embodiments of the present invention provide a method and an apparatus for establishing a 3G cell reselection list.

An embodiment of the present invention provides a method for establishing a cell reselection list, and the method includes:

obtaining a system message, where the system message includes frequency information used in a 3G neighbour cell list, and optionally includes frequency information used in a cell reselection list but not used in the 3G neighbour cell list; and establishing a cell reselection list and/or a frequency list according to the system message, establishing indexes in ascending order in the cell reselection list and/or the frequency list according to an appearance order from first to last of the frequency information used in the 3G neighbour cell list in the system message, and when the system message includes the frequency information used in the cell reselection list but not used in the 3G neighbour cell list, establishing indexes at the bottom of the cell reselection list and/or the frequency list according to an appearance order from first to last of the frequency information used in the cell reselection list but not used in the 3G neighbour cell list in the system message.

An embodiment of the present invention provides another method for establishing a cell reselection list, and the method includes:

obtaining a system message, and establishing a 3G neighbour cell list according to the system message, where the system message optionally includes frequency information that is not included in the 3G neighbour cell list;

establishing a cell reselection list according to the 3G neighbour cell list when the system message does not include the frequency information that is not included in the 3G neighbour cell list, and establishing the cell reselection list according to the 3G neighbour cell list and the system message when the system message includes the frequency information that is not included in the 3G neighbour cell list; and establishing an index for a frequency included in the 3G neighbour cell list, and when the system message includes the frequency information that is not included in the 3G neighbour cell list, establishing an index for a frequency that is not included in the 3G neighbour cell list but included in the system message.

An embodiment of the present invention further provides a method for establishing a cell reselection list, and the method includes:

obtaining a system message, where the system message includes frequency information used in a 3G neighbour cell list, and frequency information used in a cell reselection list but not used in the 3G neighbour cell list; and establishing a cell reselection list according to the system message, allocating index values in ascending order according to an appearance order from first to last of the frequency information used in the 3G neighbour cell list in the system message, and allocating the index values in a maximum value interval of the index values according to an appearance order from first to last of the frequency information used in the cell reselection list but not used in the 3G neighbour cell list in the system message.

An embodiment of the present invention further provides a method for modifying a cell reselection list, and the method includes:

obtaining a cell modification message, modifying a 3G neighbour cell list according to the cell modification message, and obtaining a modified 3G neighbour cell list; and updating a cell reselection list according to the modified 3G neighbour cell list, where an updated cell reselection list includes a frequency and/or cell information in the modified 3G neighbour cell list.

An embodiment of the present invention provides an apparatus for establishing a cell reselection list, and the apparatus includes:

an obtaining unit, configured to obtain a system message, where the system message includes frequency information used in a 3G neighbour cell list, and optionally includes frequency information used in a cell reselection list but not used in the 3G neighbour cell list; and a frequency index establishing unit, configured to construct a cell reselection list and/or a frequency list according to the system message; establish indexes in ascending order in the cell reselection list and/or the frequency list according to an appearance order from first to last of the frequency information used in the 3G neighbour cell list in the system message; and when the system message includes the frequency information used in the cell reselection list but not used in the 3G neighbour cell list, establish indexes at the bottom of the cell reselection list and/or the frequency list according to an appearance order from first to last of the frequency information used in the cell reselection list but not used in the 3G neighbour cell list.

An embodiment of the present invention further provides an apparatus for establishing a cell reselection list, and the apparatus includes:

an obtaining unit, configured to obtain a system message;

a neighbour cell list establishing unit, configured to establish a 3G neighbour cell list according to the system message, where the system message optionally includes frequency information that is not included in the 3G neighbour cell list; and a cell reselection list establishing unit, configured to construct a cell reselection list according to the 3G neighbour cell list when the system message does not include the frequency information that is not included in the 3G neighbour cell list; construct the cell reselection list according to the 3G neighbour cell list and the system message when the system message includes the frequency information that is not included in the 3G neighbour cell list, establish an index for a frequency included in the 3G neighbour cell list; and when the system message includes the frequency information that is not included in the 3G neighbour cell list, establish an index for a frequency that is not included in the 3G neighbour cell list but included in the system message.

An embodiment of the present invention further provides an apparatus for modifying a cell reselection list, and the apparatus includes:

an obtaining unit, configured to obtain a cell modification message;

a neighbour cell list modification unit, configured to modify a 3G neighbour cell list according to the cell modification message, and obtain a modified 3G neighbour cell list; and a cell reselection list modification unit, configured to update a cell reselection list according to the modified 3G neighbour cell list, where an updated cell reselection list includes a frequency and/or cell information in the modified 3G neighbour cell list.

In the technical solutions of the embodiments of the present invention, a network and a terminal establish a frequency index for a cell reselection list, so that when a network side delivers an RAT and frequency priority information, the priority information may be delivered according to the frequency index in a frequency list, thus implementing cell reselection that is based on the priority for the terminal. Furthermore, in the embodiments of the present invention, the cell reselection list may be modified through a PMO message and a PCCO message.

BRIEF DESCRIPTION OF THE DRAWINGS

FIG. 1 is a flow chart of a method for establishing a cell reselection list according to an embodiment of the present invention;

FIG. 2 is a flow chart of a method for establishing a cell reselection list according to another embodiment of the present invention;

DETAILED DESCRIPTION OF THE EMBODIMENTS

The specific embodiments of the present invention are described in further detail in the following with reference to the accompanying drawings.

In the embodiments of the present invention, both a network side and a terminal need to establish a cell reselection list. In order to facilitate the description, the embodiments of the present invention all are described by taking a process of the terminal establishing a cell reselection list for an example. Persons skilled in the art may obtain a method for establishing a cell reselection list by a corresponding network side according to the description of the embodiments without creative effort. The cell reselection list may be a 3G Cell Reselection list and/or a GPRS 3G Cell Reselection list.

An embodiment of the present invention provides a method for establishing a cell reselection list, and as shown in FIG. 1, the method includes:

obtaining a system message, where the system message includes frequency information used in a 3G neighbour cell list, and optionally includes frequency information that is used in a cell reselection list but not used in the 3G neighbour cell list; and establishing a cell reselection list and/or a frequency list according to the system message; establishing indexes in ascending order in the cell reselection list and/or the frequency list according to an appearance order from first to last of the frequency information used in the 3G neighbour cell list in the system message; and when the system message includes the frequency information used in the cell reselection list but not used in the 3G neighbour cell list, establishing indexes at the bottom of the cell reselection list and/or the frequency list according to an appearance order from first to last of the frequency information used in the cell reselection list but not used in the 3G neighbour cell list.

This embodiment may be used for newly establishing a cell reselection list and/or a frequency list. In this embodiment, the system message includes a first system message, and optionally includes a second system message. The first system message includes the frequency information used in the 3G neighbour cell list, and optionally includes the frequency information used in the cell reselection list but not used in the 3G neighbour cell list. The second system message includes the frequency information used in the cell reselection list but not used in the 3G neighbour cell list. The second system message is an optional message, and when the second system message does not exist, the first system message is the system message. When the second system message exists, and the first system message includes the frequency information used in the cell reselection list but not used in the 3G neighbour cell list, the second system message includes residual frequency information that is used in the cell reselection list but not used in the 3G neighbour cell list in the system message. When the second system message does not exist, and the first system message does not include the frequency information that is used in the cell reselection list but not used in the 3G neighbour cell list, the system message does not include the frequency information that is used in the cell reselection list but not used in the 3G neighbour cell list. Whether the first system message includes the frequency information that is used in the cell reselection list but not used in the 3G neighbour cell list and whether the second system message exists may be determined by a network condition and/or system configuration.

In this embodiment, a method for establishing the frequency list includes:

When the first system message is received, the terminal establishes frequency indexes in ascending order according to a delivery order of the first system message and an appearance order from first to last of frequency information of a 3G cell in the first system message. When the second system message is received, the terminal establishes frequency indexes in a descending manner or an ascending manner at the bottom of the cell reselection list and/or the frequency list according to a delivery order of the second system message and an appearance order from first to last of frequency information of a 3G cell in the second system message. In this embodiment, 32 frequencies may be set in a 3G frequency list, and therefore, sorting in descending order from the bottom of the list may be sorting in descending order from an index value 31, and if the sorting is performed in ascending order, the last index value is 31.

The first system message may be an SI2quater message, and the second system message may be an SI2ter.

A specific example of this embodiment is as follows.

The first system message includes 3G frequencies f1, f2, and f3, and the delivery order is f1, f2, and f3. The second system message includes 3G frequencies F1 and F2, and the delivery order is F1 and F2. A frequency index relation table formed in a newly established 3G frequency list is as shown in table 1a and table 1b. The table 1a indicates that indexes are established in descending order for the 3G frequencies F1 and F2 which are included in the second system message, and the table 1b indicates that the indexes are established in ascending order for the 3G frequencies F1 and F2 which are included in the second system message.

TABLE 1a

| Frequency list | |
|---|---|
| Index 0 | f1 |
| Index 1 | f2 |
| Index 2 | f3 |
| ... | ... |
| Index 30 | F2 |
| Index 31 | F1 |

TABLE 1b

| Frequency list | |
|---|---|
| Index 0 | f1 |
| Index 1 | f2 |
| Index 2 | f3 |
| ... | ... |
| Index 30 | F1 |
| Index 31 | F2 |

Index 0~Index 31 in the tables are frequency index values.

In this embodiment, the network and the terminal establish the frequency indexes for the 3G frequencies, so that when the network side delivers an RAT and frequency priority information, the priority information may be delivered according to the frequency index in the 3G Cell Reselection list, thus implementing cell reselection that is based on the priority for the terminal.

In another embodiment of the present invention, frequency indexes are established in a cell reselection list. In this embodiment, a system message includes a first system message, and optionally includes a second system message. The first system message includes frequency information used in a 3G neighbour cell list, and optionally includes frequency information that is used in the cell reselection list but not used in the 3G neighbour cell list. The second system message includes the frequency information that is used in the cell reselection list but not used in the 3G neighbour cell list. The second system message is an optional message, and when the second system message, such as an SI2ter, does not exist, the first system message is the system message. When the second system message exists, and the first system message includes the frequency information that is used in the cell reselection list but not used in the 3G NCL, the second system message includes residual frequency information that is used in the cell reselection list but not used in the 3G neighbour cell list in the system message.

When a terminal receives the first system message, the terminal establishes frequency indexes in an ascending manner according to a delivery order of the first system message and an appearance order from first to last of frequency information of a 3G cell in the first system message. When the terminal receives the second system message, the terminal establishes frequency indexes at the bottom of the cell reselection list according to a delivery order of the second system message and an appearance order from first to last of frequency information of a 3G cell in the second system message. In this embodiment, the terminal also places frequencies that are used in a 3G Cell Reselection list but not used in the 3G Neighbour Cell list at the bottom of the cell reselection list to establish frequency indexes.

In this embodiment, after the terminal establishes the indexes for all the 3G cell frequencies in descending order in the second system message, the terminal may establish the indexes for the frequencies that are used in the 3G Cell Reselection list but not used in the 3G Neighbour Cell list in the first system message, and obtains subsequent values of the 3G cell frequency indexes in the second system message to perform sorting in descending order.

After the terminal establishes the indexes in descending order for the frequencies that are used in the 3G Cell Reselection list but not used in the 3G Neighbour Cell list in the received first system message, the terminal may obtain subsequent values to establish the indexes for the 3G cell frequencies of the second system message in descending order.

The terminal may also establish the indexes in ascending order for the frequencies in the second system message, and obtain subsequent values of the frequency indexes in the second system message to establish the indexes in ascending order for the frequencies that are used in the cell reselection list but not used in the 3G neighbour cell list in the first system message; or establish the indexes in ascending order for the frequencies that are used in the cell reselection list but not used in the 3G neighbour cell list in the first system message, and obtain subsequent values of the indexes to establish the indexes in ascending order for the frequencies of the second system message.

In this embodiment, at most 32 frequencies may be set for the 3G frequencies, and therefore, the sorting in descending order from the bottom of the list may be the sorting in descending order from the index value 31, and if the sorting is performed in ascending order, the last index value is 31.

The first system message may be an SI2quater message, and the second system message may be an SI2ter. The first system message further includes cell scrambling, and the same frequency may be corresponding to the same frequency index despite of the cell scrambling. Cell scrambling and a frequency may identify one unique cell together.

A specific example of this embodiment is as follows.

The SI2quater message includes 3G frequencies f1, f2, f3, and f4. Cell scrambling PSC11 and PSC12 exist in the frequency f1, cell scrambling PSC21, PSC22 and PSC23 exist in the frequency f2, the frequency f3 is instructed to be added into the 3G Cell Reselection list but not to be added into the 3G Neighbour Cell list, the frequency f4 has no scrambling, and a delivery order is f1, f2, f3 and f4. The SI2ter message includes 3G frequencies F1 and F2, and a delivery order is F1 and F2. A frequency index relation table that is formed in the 3G Cell Reselection list is as shown in table 2 or table 3, and Index 0~Index 31 in the tables are frequency index values. When indexes are established in descending order from 31 for frequencies that are used in the 3G Cell Reselection list but not used in the 3G Neighbour Cell list and delivered by the SI2quater message, a frequency list is as shown in table 2. When indexes are established in descending order from 31 for the 3G frequencies that are delivered by the SI2ter message, the frequency list is as shown in table 3.

TABLE 2

| 3G Cell Reselection list for establishing frequency indexes | | |
|---|---|---|
| Index 0 | f1 | PSC11 |
| | f1 | PSC12 |

TABLE 2-continued

3G Cell Reselection list for establishing frequency indexes

| Index 1 | f2 | PSC21 |
| --- | --- | --- |
|  | f2 | PSC22 |
|  | f2 | PSC23 |
| Index 2 | f4 | — |
| ... | ... |  |
| Index 29 | F2 | — |
| Index 30 | F1 | — |
| Index 31 | f3 | — |

TABLE 3

3G Cell Reselection list for establishing frequency indexes

| Index 0 | f1 | PSC11 |
| --- | --- | --- |
|  | f1 | PSC12 |
| Index 1 | f2 | PSC21 |
|  | f2 | PSC22 |
|  | f2 | PSC23 |
| Index 2 | f4 | — |
| ... | ... |  |
| Index 29 | f3 | — |
| Index 30 | F2 | — |
| Index 31 | F1 | — |

In this embodiment, the network and the terminal establish frequency indexes for the 3G Cell Reselection list, so that when the network side delivers an RAT and frequency priority information, the priority information may be delivered according to the frequency indexes in the 3G Cell Reselection list, thus implementing cell reselection that is based on the priority for the terminal.

In an embodiment of the present invention, frequency indexes and cell indexes are established in a cell reselection list. A system message further includes cell scrambling information, and when frequencies are the same, the cell indexes are established in an ascending manner according to an appearance order from first to last of cell scrambling.

In this embodiment, when a first system message is received, a terminal establishes the frequency indexes and the cell indexes in the ascending manner according to a delivery order of the system message and frequency information of a 3G cell, and also according to the appearance order from first to last of the cell scrambling. When the frequencies are the same, the cell indexes are established in the ascending manner according to the appearance order from first to last of the cell scrambling. A cell is determined by the frequency information and the cell scrambling information.

When the terminal receives a second system message, the terminal establishes the frequency indexes at the bottom of the cell reselection list according to a delivery order of the second system message and an appearance order from first to last of frequency information of a 3G cell in the second system message. In this embodiment, the terminal also places frequencies that are used in the 3G Cell Reselection list but not used in the 3G Neighbour Cell list at the bottom of the cell reselection list to establish frequency indexes.

In this embodiment, after the terminal establishes the indexes for all the 3G cell frequencies in descending order in the second system message, the terminal may establish the indexes for the frequencies that are used in the 3G Cell Reselection list but not used in the 3G Neighbour Cell list in the first system message, and obtains subsequent values of the 3G cell frequency indexes in the second system message to perform sorting in descending order.

After the terminal establishes the indexes in descending order for the frequencies that are used in the 3G Cell Reselection list but not used in the 3G Neighbour Cell list in the received first system message, the terminal may obtain subsequent values to establish the indexes for the 3G cell frequencies of the second system message in descending order.

The terminal may also establish the indexes in ascending order for the frequencies in the second system message, and obtain subsequent values of the frequency indexes in the second system message to establish the indexes in ascending order for the frequencies that are used in the cell reselection list but not used in the 3G neighbour cell list in the first system message; or establish the indexes in ascending order for the frequencies that are used in the cell reselection list but not used in the 3G neighbour cell list in the first system message, and obtain subsequent values of the indexes to establish the indexes in ascending order for the frequencies of the second system message.

In this embodiment, at most 32 frequencies may be set for the 3G frequencies, and therefore, the sorting in descending order from the bottom of the list may be the sorting in descending order from an index value 31, and if the sorting is performed in ascending order, the last index value is 31.

In this embodiment, the first system message may be an SI2quater message, and the second system message may be an SI2ter. In this embodiment, the first system message and the second system message may be collectively called a system message. The second system message is an optional message, and when the second system message, such as the SI2ter, does not exist, the first system message is the system message.

A specific example of this embodiment is as follows.

The SI2quater message includes 3G frequencies f1, f2, f3, and f4. Cell scrambling PSC11 and PSC12 exist in the frequency f1, cell scrambling PSC21, PSC22 and PSC23 exist in the frequency f2, the frequency f3 is instructed to be added into the 3G Cell Reselection list but not to be added into the 3G Neighbour Cell list, the frequency f4 has no scrambling, and a delivery order is f1, f2, f3 and f4. The SI2ter message includes 3G frequencies F1 and F2, and a delivery order is F1 and F2. A frequency and cell index relation table that is formed in the 3G Cell Reselection list is as shown in table 4 and table 5. F_Index 0~F_Index 31 in the tables are frequency index values, and C_Index is a cell index value. When indexes are established in descending order from 31 for frequencies that are used in the 3G Cell Reselection list but not used in the 3G Neighbour Cell list and delivered by the SI2quater message, a frequency list is as shown in table 4. When indexes are established in descending order from 31 for the 3G frequencies that are delivered by the SI2ter message, the frequency list is as shown in table 5.

TABLE 4

3G Cell Reselection list for establishing frequency indexes and cell indexes

| F_Index 0 | C_Index 0 | f1 | PSC11 |
| --- | --- | --- | --- |
|  | C_Index 1 | f1 | PSC12 |
| F_Index 1 | C_Index 2 | f2 | PSC21 |
|  | C_Index 3 | f2 | PSC22 |
|  | C_Index 4 | f2 | PSC23 |
| F_Index 2 | C_Index 5 | f4 | — |
| ... |  | ... |  |
| F_Index 29 | — | F2 | — |
| F_Index 30 | — | F1 | — |
| F_Index 31 | — | f3 | — |

TABLE 5

3G Cell Reselection list for establishing
frequency indexes and cell indexes

| F_Index 0  | C_Index 0 | f1 | PSC11 |
|            | C_Index 1 | f1 | PSC12 |
| F_Index 1  | C_Index 2 | f2 | PSC21 |
|            | C_Index 3 | f2 | PSC22 |
|            | C_Index 4 | f2 | PSC23 |
| F_Index 2  | C_Index 5 | f4 | —     |
| ...        |           | ...|       |
| F_Index 29 | —         | f3 | —     |
| F_Index 30 | —         | F2 | —     |
| F_Index 31 | —         | F1 | —     |

In this embodiment, a network and a terminal establish frequency indexes and cell indexes for the 3G Cell Reselection list, so that when a network side delivers an RAT and frequency priority information, the priority information may be delivered according to the frequency indexes in the frequency list, thus implementing cell reselection that is based on the priority for the terminal. Meanwhile, the frequency indexes and the cell indexes are established for the 3G Cell Reselection list, which may be fully corresponding to the 3G Neighbour Cell list, so that the two lists are modified at the same time through a PMO message and a PCCO message without changing current PMO and PCCO message structures.

Another embodiment of the present invention provides a method for establishing a cell reselection list. As shown in FIG. 2, this embodiment includes:

S21: A system message is obtained, and a 3G Neighbour Cell List is established according to the system message, where the system message optionally includes frequency information that is not included in the 3G Neighbour Cell List. In this embodiment, the system message includes a first system message, and optionally includes a second system message. A terminal may establish the 3G Neighbour Cell List according to the first system message. The first system message includes 3G neighbour cell frequencies and scrambling information, and the 3G neighbour cell frequencies may be distinguished as frequencies used in the 3G Neighbour Cell List and a 3G Cell Reselection list, and frequencies used in the 3G Cell Reselection list but not used in the 3G Neighbour Cell list, and are instructed through an identification. In this embodiment, the first system message may be an SI2quater message, and may also be any system message that provides 3G neighbour cell frequency information.

S22: A cell reselection list is established according to the 3G Neighbour Cell List when the system message does not include the frequency information that is not included in the 3G Neighbour Cell List; and the cell reselection list is established according to the 3G Neighbour Cell List and the system message when the system message includes the frequency information that is not included in the 3G Neighbour Cell List. In this embodiment, an established cell reselection list, such as the 3G Cell Reselection list, includes frequencies and cell information in the 3G Neighbour Cell List, frequency information that is used in the 3G Cell Reselection list but not used in the 3G Neighbour Cell list, and included in the first system message, and 3G frequency information that is delivered by the second system message. The second system message includes frequency information used for cell reselection, and the second system message is generally used as supplementation of the first system message. In this embodiment, the second system message may be an SI2ter message. The terminal constructs the 3G Cell Reselection list according to the 3G Neighbour Cell List, the first system message and the second system message.

S23: Indexes are established for frequencies that are included in the 3G Neighbour Cell List, and when the system message includes the frequency information that is not included in the 3G neighbour cell list, indexes are established for frequencies that are not included in the 3G Neighbour Cell List but included in the system message.

The terminal establishes the indexes in ascending order according to an appearance order from first to last of the frequencies in the 3G Neighbour Cell List. An index of a first frequency in the 3G Neighbour Cell List may be 0. The terminal establishes indexes in descending order or an ascending order at the bottom of the cell reselection list according to an appearance order from first to last of the frequencies that are not included in the 3G Neighbour Cell List but included in the system message. In this embodiment, indexes of frequencies that are used in the 3G Cell Reselection list but not used in the 3G Neighbour Cell list in the first system message may be set to be indexes beginning from the bottom of the list, for example, beginning from 31. As for frequencies in the second system message, subsequent values of the indexes of the frequencies that are used in the 3G Cell Reselection list but not used in the 3G Neighbour Cell list in the first system message are correspondingly obtained in descending order or an ascending order. Alternatively, the indexes of the frequencies in the second system message may also be set to be the indexes beginning from the bottom of the list. Specifically, the indexes are established in descending order for the frequencies in the second system message, subsequent values of the indexes of the frequencies in the second system message are obtained to establish indexes in descending order for the frequencies that are not included in the 3G Neighbour Cell list but included in the first system message; or indexes are established in descending order for the frequencies that are not included in the 3G Neighbour Cell list but included in the first system message, and subsequent values of the indexes are obtained to establish indexes in descending order for the frequencies of the second system message; or indexes are established in ascending order for the frequencies in the second system message, and subsequent values of the indexes of the frequencies in the second system message are obtained to establish indexes in ascending order for the frequencies that are not included in the 3G Neighbour Cell list but included in the first system message; or the indexes are established in ascending order for the frequencies that are not included in the 3G Neighbour Cell list but included in the first system message, and subsequent values of the indexes are obtained to establish the indexes in ascending order for the frequencies of the second system message.

In this embodiment, an operation of establishing the indexes for the frequencies that are included in the 3G Neighbour Cell List, and an operation of establishing the indexes for the frequencies that are not included in the 3G Neighbour Cell List but included in the first system message and the frequencies that are included in the second system message have no process sequential relation.

If the 3G Neighbour Cell list is modified through a PMO message or a PCCO message, the terminal may update a GPRS 3G Cell Reselection list according to an updated 3G Neighbour Cell list. The terminal may update indexes of frequencies in the GPRS 3G Cell Reselection list according to the updated 3G Neighbour Cell list.

In another embodiment of the present invention, when a terminal constructs a cell reselection list, not only frequency indexes are established, but also cell indexes are established according to an appearance order from first to last of cell scrambling in a system message, and a manner of establishing the cell indexes is the same as a manner of establishing the cell indexes in the 3G Neighbour Cell list. When the frequencies are the same, the cell indexes are established in an ascending manner according to the appearance order from first to last of the cell scrambling in the system message.

In this embodiment, the second system message is an optional message, and when the second system message does not exist, the first system message is the system message.

In this embodiment, a network and a terminal establish frequency indexes for a cell reselection list, and optionally establish cell indexes, so that when a network side delivers an RAT and frequency priority information, the priority information may be delivered according to frequency indexes in a frequency list, thus implementing cell reselection that is based on the priority for the terminal. Meanwhile, frequency indexes and cell indexes are established for the cell reselection list, which may be fully corresponding to the 3G Neighbour Cell list, and the two lists are modified at the same time through a PMO message and/or a PCCO message without changing current PMO and PCCO message structures.

An embodiment of the present invention further provides a method for establishing a cell reselection list, and the method includes:

obtaining a system message, where the system message includes frequency information used in a 3G neighbour cell list, and optionally includes frequency information that is used in a cell reselection list but not used in the 3G neighbour cell list; and establishing a cell reselection list according to the system message, allocating index values according to an appearance order from first to last of the frequency information used in the 3G neighbour cell list in the system message, and when the system message includes the frequency information that is used in the cell reselection list but not used in the 3G neighbour cell list, allocating index values in a maximum value interval of the index values according to the appearance order from first to last of the frequency information that is used in the cell reselection list but not used in the 3G neighbour cell list in the system message.

In this embodiment, at most 32 frequencies may be set for 3G frequencies, and the allocating the index values in maximum value interval of the index values may be obtaining the maximum value interval of the index values according to the number of frequencies of the indexes that are required to be established. For example, when indexes need to be established for three frequencies that are used in the cell reselection list but not used in the 3G neighbour cell list, a terminal may obtain an index value interval [29, 31] of the index values, and allocates the index values in ascending order or descending order according to an appearance order from first to last of the frequency information in the system message.

The system message includes a first system message, and optionally includes a second system message, where the first system message includes the frequency information used in the 3G neighbour cell list, and optionally includes the frequency information that is used in the cell reselection list but not used in the 3G neighbour cell list. When the system message includes the second system message, the second system message includes the frequency information that is used in the cell reselection list but not used in the 3G neighbour cell list. When the second system message does not exist, the first system message is the system message. When the second system message exists, and the first system message includes the frequency information that is used in the cell reselection list but not used in the 3G neighbour cell list, the second system message includes residual frequency information that is used in the cell reselection list but not used in the 3G neighbour cell list in the system message. When the second system message does not exist, and the first system message does not include the frequency information that is used in the cell reselection list but not used in the 3G neighbour cell list, the system message does not include the frequency information that is used in the cell reselection list but not used in the 3G neighbour cell list. Whether the first system message includes the frequency information that is used in the cell reselection list but not used in the 3G neighbour cell list and whether the second system message exists may be determined by a network condition and/or system configuration.

In this embodiment, the allocating the index values in the maximum value interval of the index values according to the appearance order from first to last of the frequency information that is used in the cell reselection list but not used in the 3G neighbour cell list in the system message includes:

allocating index values in descending order in a maximum value interval of the index values for frequencies in the second system message, and obtaining subsequent values of the indexes of the frequencies in the second system message to allocate index values in descending order for the frequencies that are used in the cell reselection list but not used in the 3G neighbour cell list in the first system message; or allocating index values in descending order in a maximum value interval of the index values for the frequencies that are used in the cell reselection list but not used in the 3G neighbour cell list in the first system message, and obtaining subsequent values of the indexes to allocate the index values in descending order for the frequencies of the second system message; or allocating the index values in ascending order in the maximum value interval of the index values for the frequencies in the second system message, and obtaining the subsequent values of the indexes of the frequencies in the second system message to allocate the index values in ascending order for the frequencies that are used in the cell reselection list but not used in the 3G neighbour cell list in the first system message; or allocating the index values in ascending order in the maximum value interval of the index values for the frequencies that are used in the cell reselection list but not used in the 3G neighbour cell list in the first system message, and obtaining the subsequent values of the indexes to allocate the index values in ascending order for the frequencies of the second system message.

The system message further includes cell scrambling information, and the method further includes: when the frequencies are the same, allocating cell index values in an ascending manner according to an appearance order from first to last of cell scrambling.

In this embodiment, a network and a terminal establish frequency indexes and cell indexes for a 3G Cell Reselection list, so that when a network side delivers an RAT and frequency priority information, the priority information may be delivered according to frequency indexes in a frequency list, thus implementing cell reselection that is based on the priority for the terminal. Meanwhile, frequency indexes and cell indexes are established for the 3G Cell Reselection list, which may be fully corresponding to the 3G Neighbour Cell list, and the two lists are modified at the same time through a PMO message and a PCCO message without changing current PMO and PCCO message structures.

Figure 3:
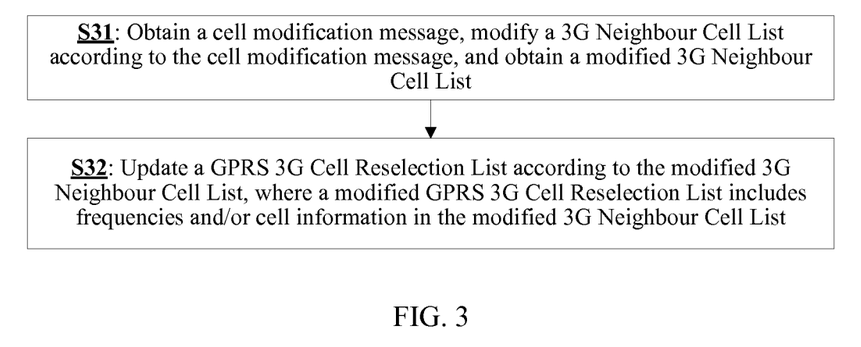
FIG. 3 is a flow chart of a method for modifying a cell reselection list according to another embodiment of the present invention.

An embodiment of the present invention further provides a method for modifying a GPRS 3G Cell Reselection list, and the method includes:

S31: A cell modification message is obtained, and a 3G Neighbour Cell list is modified according to the cell modification message, and a modified 3G Neighbour Cell list is obtained. The cell modification message may be a PMO message or a PCCO message. A terminal may obtain the PCCO message before receiving a system message that is used in a GPRS 3G Cell Reselection list, and obtains the PMO message after receiving the system message that is used in the GPRS 3G Cell Reselection list.

S32: The GPRS 3G Cell Reselection list is updated according to the modified 3G Neighbour Cell list, where an updated GPRS 3G Cell Reselection list includes frequency(s) and/or cell(s) information in the modified 3G Neighbour Cell list. The terminal updates corresponding frequency(s) and/or cell(s) information that is included in the GPRS 3G Cell Reselection list according to the frequencies and/or the cell information in the modified 3G Neighbour Cell list. In this embodiment, the updating may be: cells and/or frequencies in the modified 3G Neighbour Cell list are used to cover cells and/or frequencies in the GPRS 3G cell reselection list, and these cells and/or frequencies are included in the 3G Neighbour Cell list before the modification.

In this embodiment, a method for establishing the GPRS 3G Cell Reselection list may be as described in the foregoing embodiments, and may also adopt a current establishing method.

After the GPRS 3G Cell Reselection list is modified, this embodiment of the present invention further includes: establishing indexes for the frequencies in the GPRS 3G Cell Reselection list. According to an appearance order from first to last of the frequencies in the 3G Neighbour Cell List, indexes are established in ascending order for the frequencies that are included in the 3G Neighbour Cell List. An index of a first frequency in the 3G Neighbour Cell List may be 0. As for frequencies that are not included in the 3G Neighbour Cell list in the system message, index values of the frequencies are invariant.

The GPRS 3G Cell Reselection list includes frequencies and scrambling information of all neighbour cells in the 3G Neighbour Cell list, and probably includes frequency information that is not included in the 3G Neighbour Cell list in the system message, and neighbour cell information that is included in the 3G Neighbour Cell list may be modified through the PMO message and/or the PCCO message, and frequencies that are not included in the 3G Neighbour Cell list in the system message does not need to be modified once being established, therefore, in this embodiment of the present invention, the GPRS 3G Cell Reselection list may be modified through the PMO message and the PCCO message.

In this embodiment, the system message includes a first system message and a second system message, where the first system message may be an SI2quater message, and the second system message may be an SI2ter message. The second system message is an optional message, and when the second system message does not exist, the first system message is the system message.

Figure 4:
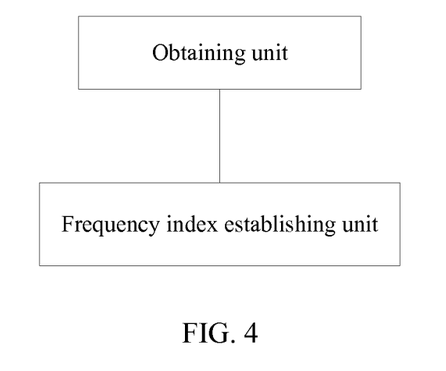
FIG. 4 is a block diagram of an apparatus for establishing a cell reselection list according to an embodiment of the present invention.

An embodiment of the present invention further provides an apparatus for establishing a cell reselection list, and as shown in FIG. 4, the apparatus includes an obtaining unit and a frequency index establishing unit.

The obtaining unit is configured to obtain a system message, where the system message includes frequency information used in a 3G neighbour cell list, and optionally includes frequency information that is used in a cell reselection list but not used in the 3G neighbour cell list.

The frequency index establishing unit is configured to construct a cell reselection list and/or a frequency list according to the system message; establish indexes in the cell reselection list and/or the frequency list in ascending order according to an appearance order from first to last of the frequency information that is used in the 3G Neighbour Cell list in the system message; and when the system message includes the frequency information that is used in the cell reselection list but not used in the 3G neighbour cell list, establish indexes at the bottom of the cell reselection list and/or the frequency list according to an appearance order from first to last of the frequency information that is used in the cell reselection list but not used in the 3G neighbour cell list.

In this embodiment, the system message includes a first system message, and optionally includes a second system message. The first system message includes the frequency information used in the 3G neighbour cell list, and optionally includes the frequency information that is used in the cell reselection list but not used in the 3G neighbour cell list. When the system message includes the second system message, the second system message includes the frequency information that is used in the cell reselection list but not used in the 3G neighbour cell list. When the second system message does not exist, the first system message is the system message. When the second system message exists, and the first system message includes the frequency information that is used in the cell reselection list but not used in the 3G neighbour cell list, the second system message includes residual frequency information that is used in the cell reselection list but not used in the 3G neighbour cell list in the system message. When the second system message does not exist, and the first system message does not include the frequency information that is used in the cell reselection list but not used in the 3G neighbour cell list, the system message does not include the frequency information that is used in the cell reselection list but not used in the 3G neighbour cell list. Whether the first system message includes the frequency information that is used in the cell reselection list but not used in the 3G neighbour cell list and whether the second system message exists may be determined by a network condition and/or system configuration.

The frequency index establishing unit establishes indexes in descending order for frequencies in the second system message, and obtains subsequent values of the indexes of the frequencies in the second system message to establish indexes in descending order for frequencies that are used in the cell reselection list but not used in the 3G Neighbour Cell list in the first system message. Alternatively, the frequency index establishing unit establishes the indexes in descending order for the frequencies that are used in the cell reselection list but not used in the 3G Neighbour Cell list in the first system message, and then obtains subsequent values of the indexes to establish indexes in descending order for the frequencies of the second system message. Alternatively, the frequency index establishing unit establishes the indexes in ascending order for the frequencies in the second system message, and obtains subsequent values of the indexes of the frequencies in the second system message to establish the indexes in ascending order for the frequencies that are used in the cell reselection list but not used in the 3G neighbour cell list in the first system message; or establishes the indexes in ascending order for the frequencies that are used in the cell reselection list but not used in the 3G neighbour cell list in the first system message, and obtains the subsequent values of the indexes to establish the indexes in ascending order for the frequencies of the second system message.

Figure 5:
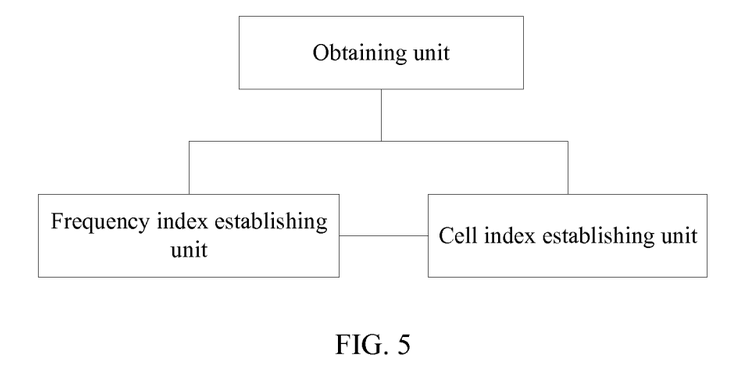
FIG. 5 is a block diagram of an apparatus for establishing a cell reselection list according to another embodiment of the present invention.

As shown in FIG. 5, in this embodiment, the apparatus for establishing the cell reselection list may further includes a cell index establishing unit. The system message further includes cell scrambling information, and the cell index establishing unit is configured to establish cell indexes in an ascending manner according to an appearance order from first to last of cell scrambling when the frequencies are the same.

In this embodiment, a network and a terminal establish frequency indexes for 3G frequencies, so that when a network side delivers an RAT and frequency priority information, the priority information may be delivered according to frequency indexes in a 3G Cell Reselection list, thus implementing cell reselection that is based on the priority for the terminal.

Figure 6:
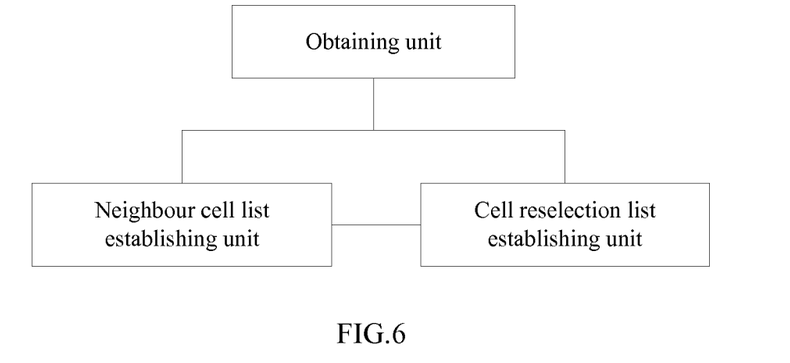
FIG. 6 is a block diagram of an apparatus for establishing a cell reselection list according to an embodiment of the present invention.

An embodiment of the present invention further provides an apparatus for establishing a cell reselection list, and as shown in FIG. 6, the apparatus includes an obtaining unit, a neighbour cell list establishing unit, and a cell reselection list establishing unit.

The obtaining unit is configured to obtain a system message.

The neighbour cell list establishing unit is configured to establish a 3G Neighbour Cell list according to the system message, where the system message optionally includes frequency information that is not included in the 3G Neighbour Cell list.

The cell reselection list establishing unit is configured to construct a cell reselection list according to the 3G neighbour cell list when the system message does not include the frequency information that is not included in the 3G neighbour cell list; construct the cell reselection list according to the 3G Neighbour Cell list and the system message when the system message includes the frequency information that is not included in the 3G neighbour cell list; establish indexes for frequencies that are included in the 3G Neighbour Cell list, and when the system message includes the frequency information that is not included in the 3G neighbour cell list, establish indexes for frequencies that are not included in the 3G Neighbour Cell list but included in the system message.

The system message further includes cell scrambling information, and the cell reselection list establishing unit is further configured to establish cell indexes in an ascending manner according to an appearance order from first to last of cell scrambling in the system message when frequencies are the same.

The obtaining unit is further configured to obtain a cell modification message, and the neighbour cell list establishing unit is further configured to modify the 3G Neighbour Cell list according to the cell modification message, and obtain a modified 3G Neighbour Cell list. The cell reselection list establishing unit is further configured to update the cell reselection list according to the modified 3G Neighbour Cell list.

In this embodiment, the system message includes a first system message and a second system message. The apparatus for establishing the cell reselection list may establish the 3G Neighbour Cell List according to the first system message. The first system message may be an SI2quater message, and the second system message may be an SI2ter message. The second system message is an optional message, and when the second system message does not exist, the first system message is the system message.

In this embodiment, the apparatus for establishing the cell reselection list, such as a network or a terminal, establishes frequency indexes for the cell reselection list, and optionally establishes cell indexes, so that when a network side delivers an RAT and frequency priority information, the priority information may be delivered according to frequency indexes in a frequency list, thus implementing cell reselection that is based on the priority for the terminal. Meanwhile, frequency indexes and cell indexes are established for the cell reselection list, which may be fully corresponding to the 3G Neighbour Cell list, and the two lists are modified at the same time through a PMO message and/or a PCCO message without changing current PMO and PCCO message structures.

Figure 7:
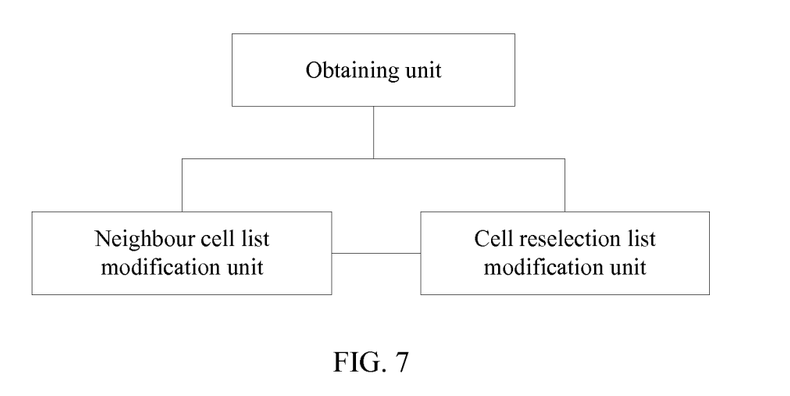
FIG. 7 is a block diagram of an apparatus for modifying a cell reselection list according to an embodiment of the present invention.

An embodiment of the present invention further provides an apparatus for modifying a cell reselection list, and the apparatus may be a network side or a terminal. As shown in FIG. 7, the apparatus includes an obtaining unit, a neighbour cell list modification unit, and a cell reselection list modification unit.

The obtaining unit is configured to obtain a cell modification message.

The NCL modification unit is configured to modify a 3G Neighbour Cell list according to the cell modification message, and obtain a modified 3G Neighbour Cell list.

The cell reselection list modification unit is configured to update a cell reselection list according to the modified 3G Neighbour Cell list, where an updated cell reselection list includes frequency(s) and/or cell(s) information in the modified 3G Neighbour Cell list.

The cell modification message is a PMO message and/or a PCCO message, and the cell reselection list is a GPRS 3G Cell Reselection list.

The cell reselection list modification unit is further configured to establish indexes for frequencies in the cell reselection list, and establish indexes in ascending order for frequencies that are included in the 3G Neighbour Cell list according to an appearance order form first to last of the frequencies in the 3G Neighbour Cell list.

In this embodiment, the GPRS 3G Cell Reselection list includes frequencies and scrambling information of all neighbour cells in the 3G Neighbour Cell list, and probably includes frequency information that is not included in the 3G Neighbour Cell list in the system message, and neighbour cell information in the 3G Neighbour Cell list is modified through the PMO message and/or the PCCO message, and frequencies that are not included in the 3G Neighbour Cell list in the system message does not need to be modified once being established, therefore, in this embodiment of the present invention, the GPRS 3G Cell Reselection list may be modified through the PMO message and the PCCO message.

In the description of the present invention, each embodiment may independently become a solution that embodies a main point of the present invention, and is used to explain the protection scope of the claims from multiple angles. Meanwhile, the description of each embodiment may be mutually quoted and combined so that persons skilled in the art may understand the solution in each embodiment more clearly.

The preceding descriptions are merely exemplary embodiments of the present invention, but are not intended to limit the present invention. Any modification, equivalent replacement, or improvement made without departing from the spirit and principle of the present invention shall fall within the protection scope of the present invention.

The invention claimed is:

1. A method for modifying a cell reselection list, comprising:

obtaining, by a user equipment, a cell modification message from a network, wherein the cell modification message includes neighbor cell information indicating information of at least one cell neighboring a serving cell of the user equipment for performing a measurement by the UE of the at least one neighboring cell, the cell modification message being a packet measurement order (PMO) message or a packet cell change order (PCCO) message;

updating, by the user equipment, a general packet radio service (GPRS) 3G cell reselection list by performing:

modifying, by the user equipment, a 3G neighbor cell list according to the neighbor cell information in the cell modification message to obtain a modified 3G neighbor cell list; and updating, by the user equipment, the GPRS 3G cell reselection list according to the modified 3G neighbor cell list to obtain an updated GPRS 3G cell reselection list, wherein the updated GPRS 3G cell reselection list comprises frequency(s) and/or cell information in the modified 3G neighbor cell list.

2. The method according to claim 1, further comprises: adding the frequency(s) and/or the cell information in the modified 3G neighbor cell list into the GPRS 3G cell reselection list.

3. The method according to claim 1, further comprising: establishing an index for the frequency(s) in the GPRS 3G cell reselection list, and establishing indexes in ascending order for the frequencies in the 3G neighbor cell list according to an appearance order from first to last of the frequencies in the 3G neighbor cell list, wherein the index of frequency(s) in GPRS 3G cell reselection list is updated according to the indexes for the frequencies in the 3G neighbor list.

4. The method according to claim 1, wherein the method further comprises:
obtaining the PCCO message before receiving a system message that is used in the GPRS 3G cell reselection list.

5. The method according to claim 4, wherein the system message is an SI2quater message or comprises an SI2quater message and an SI2ter message.

6. The method according to claim 1, wherein method further comprises:
obtaining the PMO message after receiving a system message that is used in the GPRS 3G cell reselection list.

7. The method according to claim 6, wherein the system message is an SI2quater message or comprises an SI2quater message and an SI2ter message.

8. The method according to claim 1, wherein the method further comprises:
adding the frequency(s) and/or cell information in the modified 3G neighbor Cell list into the GPRS 3G cell reselection list, wherein the frequency(s) and/or cell information is included in the 3G neighbor Cell list before modifying.

9. The method according to claim 1, wherein an index value of a first frequency in the 3G neighbor cell list is 0, and for frequency(s) that is not included in the 3G neighbor cell list in a system message, index value of the frequency(s) is invariant.

10. A user equipment, comprising:
at least one processor configured to:
obtain a cell modification message from a network, wherein the cell modification message includes neighbor cell information indicating information of at least one cell neighboring a serving cell of the user equipment for performing a measurement by the UE of the at least one neighboring cell, the cell modification message being a packet measurement order (PMO) message or a packet cell change order (PCCO) message;
updating a general packet radio service (GPRS) 3G cell reselection list by performing:
modify a 3G neighbor cell list according to the neighbor cell information in the cell modification message to obtain a modified 3G neighbor cell list; and
update the GPRS 3G cell reselection list according to the modified 3G neighbor cell list to obtain an updated GPRS 3G cell reselection list, wherein the updated GPRS 3G cell reselection list comprises frequency(s) and/or cell information in the modified 3G neighbor cell list.

11. The user equipment according to claim 10, wherein the at least one processor is further configured to adding the frequency(s) and/or the cell information in the modified 3G neighbor cell list into the GPRS 3G cell reselection list.

12. The user equipment according to claim 10, the at least one processor is further configured to:
establish an index for the frequency(s) in the GPRS 3G cell reselection list, and establish indexes in ascending order for the frequencies in the 3G neighbor cell list according to an appearance order from first to last of the frequencies in the 3G neighbor-cell list, wherein the index of frequency(s) in GPRS 3G cell reselection list is updated according to the indexes for the frequencies in the 3G neighbor list.

13. The user equipment according to claim 10, wherein the at least one processor is further configured to:
obtain the PCCO message before receiving a system message that is used in the GPRS 3G cell reselection list.

14. The user equipment according to claim 10, wherein the at least one processor is further configured to:
obtain the PMO message after receiving a system message that is used in the GPRS 3G cell reselection list.

15. The user equipment according to claim 10, wherein an index value of a first frequency in the 3G neighbor cell list is 0, and for frequency(s) that is not included in the 3G neighbor cell list in a system message, index value of the frequency(s) is invariant.

16. A non-transitory machine-readable medium having stored thereon, a computer program comprising at least one code section for distributing data, the at least one code section being executable by a user equipment to perform acts of:
obtaining a cell modification message from a network, wherein the cell modification message includes neighbor cell information indicating information of at least one cell neighboring a serving cell of the user equipment for performing a measurement by the UE of the at least one neighboring cell, the cell modification message being a packet measurement order (PMO) message or a packet cell change order (PCCO) message;
updating, by the user equipment, a general packet radio service (GPRS) 3G cell reselection list by performing:
modifying a 3G neighbor cell list according to the neighbor cell information in the cell modification message to obtain a modified 3G neighbor cell list; and
updating the GPRS 3G cell reselection list according to the modified 3G neighbor cell list to obtain an updated GPRS 3G cell reselection list, wherein the updated GPRS 3G cell reselection list comprises frequency(s) and/or cell information in the modified 3G neighbor cell list.

17. The non-transitory machine-readable medium according to claim 16, wherein the at least one code section being executable by the user equipment causes the apparatus to perform a further act of:
establishing an index for the frequency(s) in the GPRS 3G cell reselection list, and
establishing indexes in ascending order for the frequencies in the 3G neighbor cell list according to an appearance order from first to last of the frequencies in the 3G neighbor-cell list, wherein the index of frequency(s) in GPRS 3G cell reselection list is updated according to the indexes for the frequencies in the 3G neighbor list.

* * * * *